(12) United States Patent
Lee

(10) Patent No.: US 8,042,523 B2
(45) Date of Patent: Oct. 25, 2011

(54) FUEL SUPPLY SYSTEM FOR VEHICLE

(75) Inventor: Sungwon Lee, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 327 days.

(21) Appl. No.: 12/488,324

(22) Filed: Jun. 19, 2009

(65) Prior Publication Data
US 2010/0037869 A1 Feb. 18, 2010

(30) Foreign Application Priority Data
Aug. 14, 2008 (KR) .................. 10-2008-0080111

(51) Int. Cl.
F16K 24/04 (2006.01)
B65D 6/00 (2006.01)

(52) U.S. Cl. ....... 123/516; 220/4.14; 220/562; 137/202; 137/587

(58) Field of Classification Search .................. 123/516, 123/518–519, 509; 220/4.14, 562; 137/43, 137/197–199, 202, 583–589
See application file for complete search history.

(56) References Cited

U.S. PATENT DOCUMENTS

| 4,960,153 | A | * | 10/1990 | Bergsma ................. 137/587 |
| 5,083,583 | A | * | 1/1992 | Benjey ................... 137/587 |
| 5,497,800 | A | * | 3/1996 | Ohashi et al. ............. 137/110 |
| 5,535,772 | A | * | 7/1996 | Roetker et al. ............ 137/43 |
| 5,632,296 | A | * | 5/1997 | Kasugai et al. ........... 137/43 |
| 5,687,778 | A | * | 11/1997 | Harris .................... 141/59 |
| 5,694,968 | A | * | 12/1997 | Devall et al. ............ 137/202 |
| 5,755,252 | A | * | 5/1998 | Bergsma et al. .......... 137/202 |
| 5,950,655 | A | * | 9/1999 | Benjey ................... 137/43 |
| 6,170,510 | B1 | * | 1/2001 | King et al. .............. 137/202 |
| 6,311,675 | B2 | * | 11/2001 | Crary et al. ............. 123/516 |
| 6,425,379 | B2 | * | 7/2002 | Shimamura et al. ....... 123/516 |
| 6,520,200 | B1 | * | 2/2003 | Lawrukovich et al. ..... 137/202 |
| 6,758,235 | B2 | * | 7/2004 | Frohwein et al. ......... 137/202 |
| 6,959,721 | B2 | * | 11/2005 | Burke et al. ............. 137/202 |
| 7,228,847 | B2 | * | 6/2007 | Burke et al. ............. 123/509 |
| 7,690,362 | B2 | * | 4/2010 | Pike et al. .............. 123/516 |
| 2003/0094458 | A1 | * | 5/2003 | Beyer et al. ............. 220/562 |
| 2006/0260129 | A1 | * | 11/2006 | Bergsma et al. ......... 29/890.124 |
| 2010/0252125 | A1 | * | 10/2010 | Roth et al. .............. 137/409 |

FOREIGN PATENT DOCUMENTS
KR    1998-0001126 A    3/1998
* cited by examiner

Primary Examiner — Thomas Moulis
(74) Attorney, Agent, or Firm — Morgan, Lewis & Bockius LLP

(57) ABSTRACT

A fuel supply system for a vehicle may include a fuel tank including a mounting portion protruding downwards from an upper inner surface of the fuel tank, a fuel limit vent valve and a rollover valve that is connected with the fuel limit vent valve within the fuel tank, and a mounting plate connecting the fuel limit vent valve and the rollover valve and configured to be mounted onto the mounting portion of the fuel tank.

15 Claims, 8 Drawing Sheets

FUEL SUPPLY SYSTEM FOR VEHICLE

CROSS-REFERENCE TO RELATED APPLICATIONS

This application claims priority to Korean Patent Application Number 10-2008-0080111 filed on Aug. 14, 2008, the entire contents of which are incorporated herein for all purposes by this reference.

BACKGROUND OF THE INVENTION

1. Field of the Invention

The present invention relates to a fuel supply system for a vehicle. More particularly, the present invention relates to a fuel supply system for a vehicle of which a fuel limit vent valve and a rollover valve are disposed within a fuel tank with simple structure.

2. Description of Related Art

Recently, environmental concerns have been raised worldwide. Also, in the field of automobile manufacturing, exhaust control and regulations of evaporation gas that may escape during fueling are strict.

A fuel tank for satisfying the evaporation gas regulations has been under investigation.

However, a general fuel tank is made of a metal material, has a complicated scheme, and is relatively costly.

For overcoming the above problems it has been made of a plastic material, but a plastic fuel tank requires a film for eliminating permeability of the evaporation gas.

Also, for configuring a fuel limit vent valve and a rollover valve within a plastic fuel tank, the scheme of the fuel tank is complicated, and weight and cost of the fuel tank is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a fuel supply system for a vehicle in which a fuel limit vent valve and a rollover valve are easily configured.

In an aspect of the present invention, the fuel supply system for a vehicle may include, a fuel tank including a mounting portion protruding downwards from an upper inner surface of the fuel tank, a fuel limit vent valve and a rollover valve that is connected with the fuel limit vent valve within the fuel tank, and a mounting plate connecting the fuel limit vent valve and the rollover valve and configured to be mounted onto the mounting portion of the fuel tank, and wherein the mounting portion is monolithically formed to the fuel tank, wherein the fuel tank is made of a plastic material.

The mounting portion may include side mounting portions that are symmetrically formed with respect to a longitudinal axis of the fuel limit vent valve and the rollover valve to receive the mounting plate therein wherein at least a protruding plate is formed to the mounting plate and is mounted onto the side mounting portions, and wherein the protruding plate is formed by cutting off and bending an end portion of the mounting plate downwards.

Distance between lower sides of the side mounting portions may be shorter than distance between upper sides of the side mounting portions, wherein a protruding plate is formed to the mounting plate and is mounted onto the lower sides of the side mounting portions.

In an aspect of the present invention, the mounting portion may include a rear mounting portion configured to support the mounting plate in a rear position of the mounting plate.

In further another aspect of the present invention, wherein an evaporation gas exhaust passage is formed to the mounting plate to fluid-communicate the outside with the fuel limit vent valve and a connection passage is formed to the mounting plate to fluid-communicate the fuel limit vent valve with the evaporation gas exhaust passage, wherein the evaporation gas exhaust passage is connected with a canister that is disposed outside the fuel tank, wherein the diameter of the connection passage is smaller than the diameter of the evaporation gas exhaust passage, wherein a longitudinal axis of the evaporation gas exhaust passage is disposed lower than a longitudinal axis of the connection passage, and wherein the evaporation gas exhaust passage is coupled to an upper portion of the fuel limit vent valve and the connection passage is coupled to an upper portion of the rollover valve.

As described above, a fuel supply system for a vehicle according to an exemplary embodiment of the present invention may be easily provided with a fuel limit vent valve and a rollover valve within the fuel supply system.

In addition, the fuel system according to an exemplary embodiment of the present invention may be made of a plastic material with a simple scheme and reduced weight.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
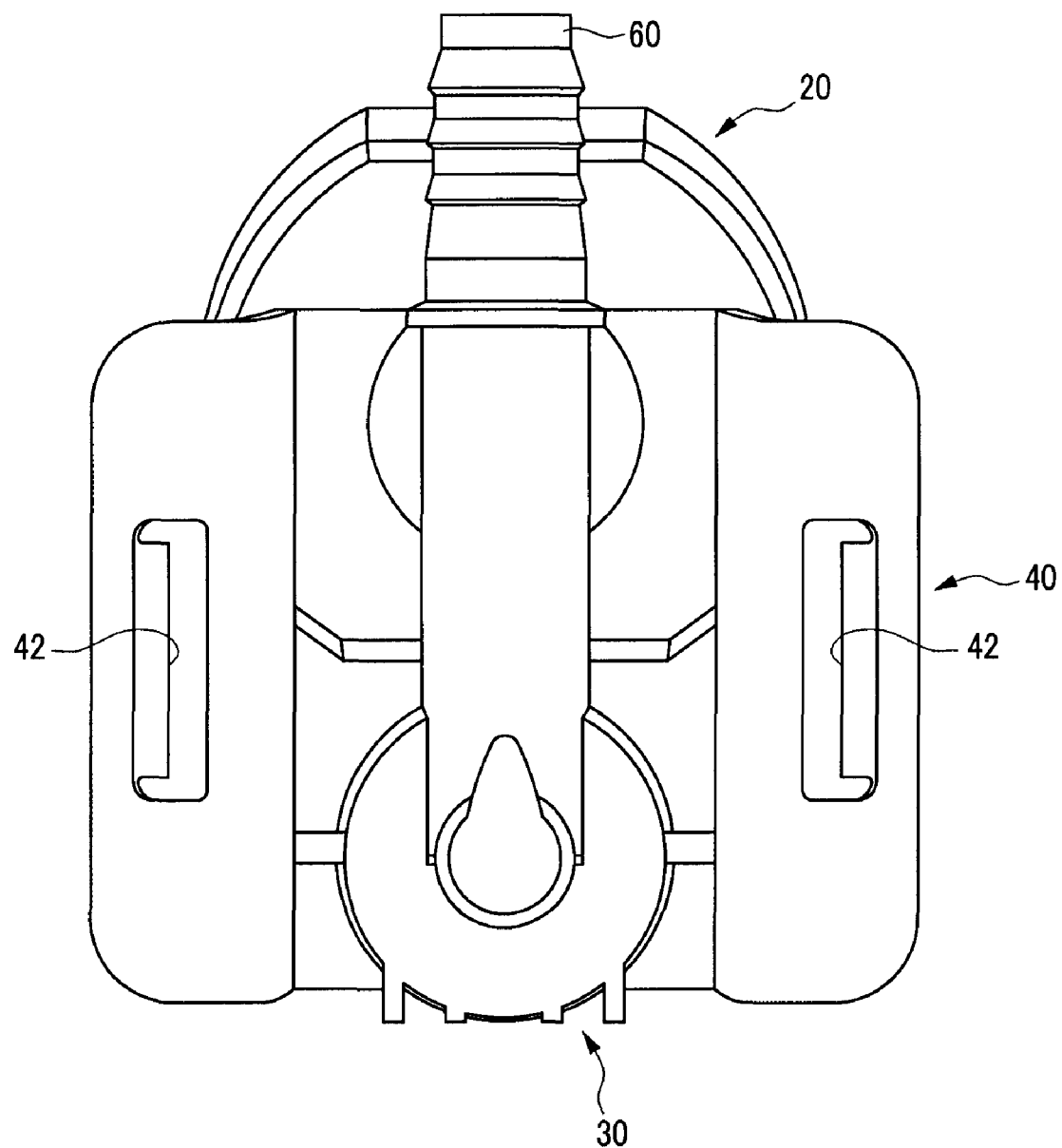
FIG. 1 is a top plan view showing that a fuel limit vent valve and a rollover valve are connected with a mounting plate of an exemplary fuel supply system according to the present invention.
Figure 2:
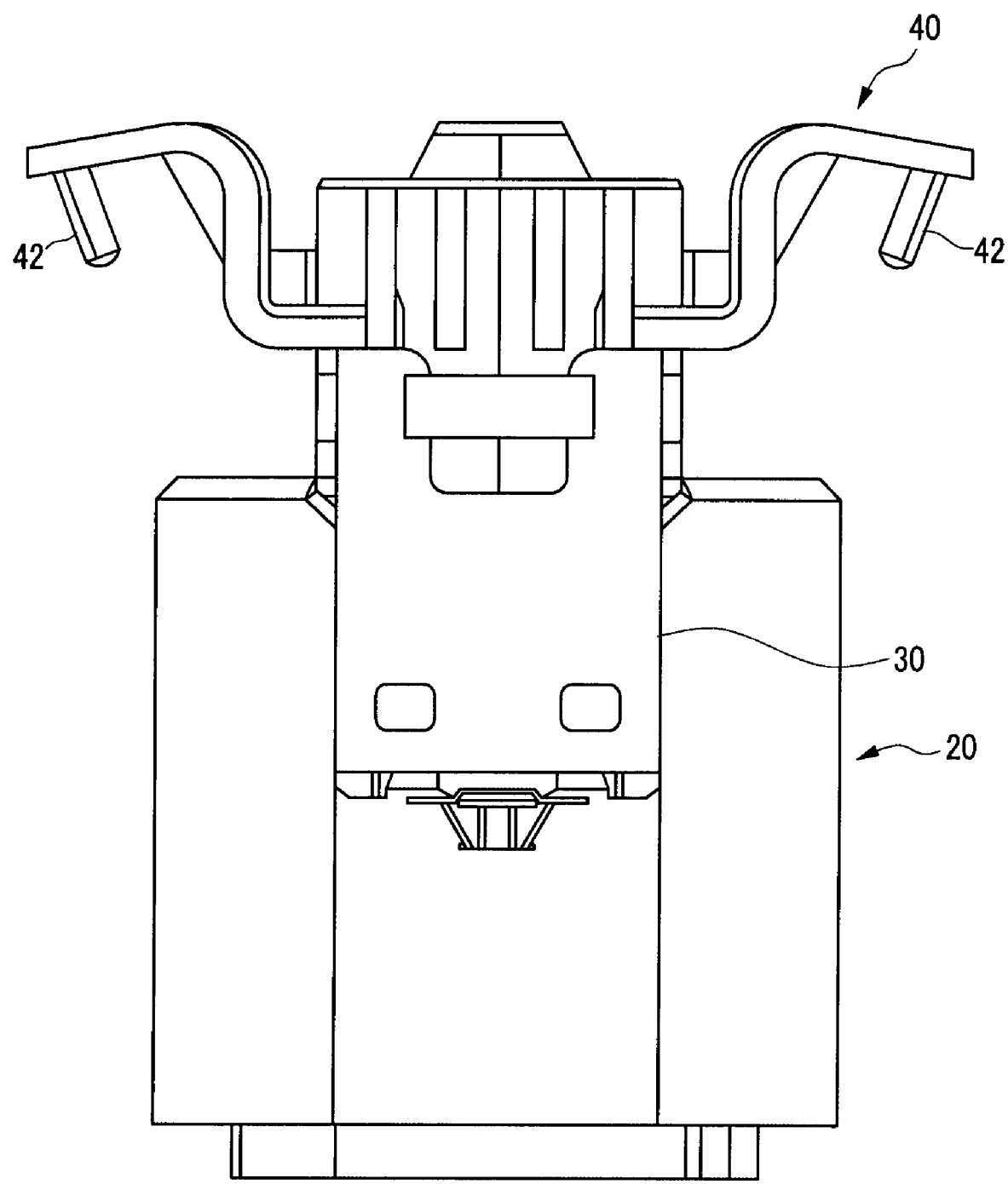
FIG. 2 is a front view showing that a fuel limit vent valve and a rollover valve are connected with a mounting plate of an exemplary fuel supply system according to the present invention.
Figure 3:
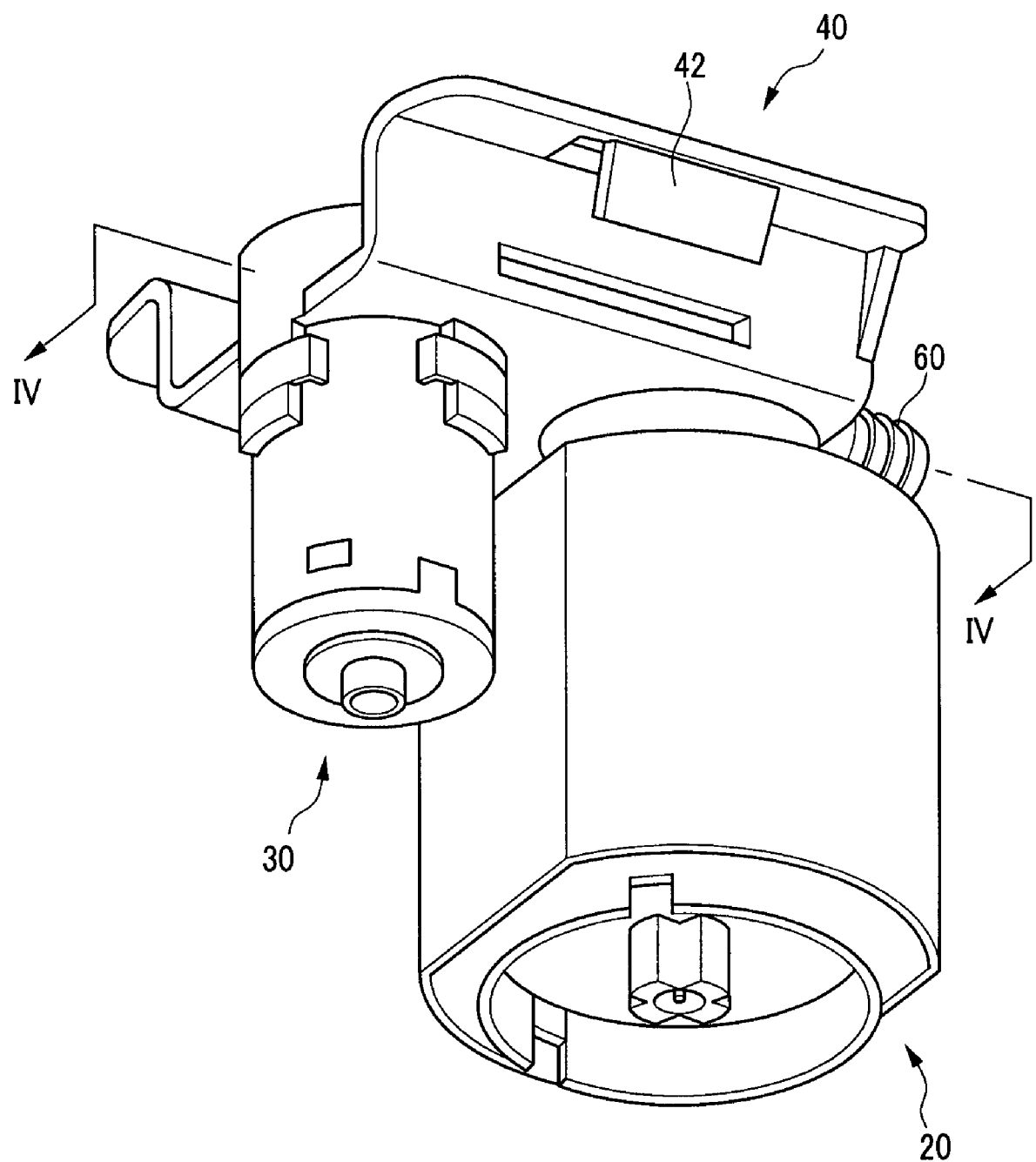
FIG. 3 is a perspective view showing that a fuel limit vent valve and a rollover valve are connected with a mounting plate of an exemplary fuel supply system according to the present invention.

FIG. 1, FIG. 2, and FIG. 3 are respectively a top plan view, a front view, and a perspective view showing that a fuel limit vent valve and a rollover valve are connected with a mounting plate of a fuel supply system according to various embodiments of the present invention.

Figure 4:
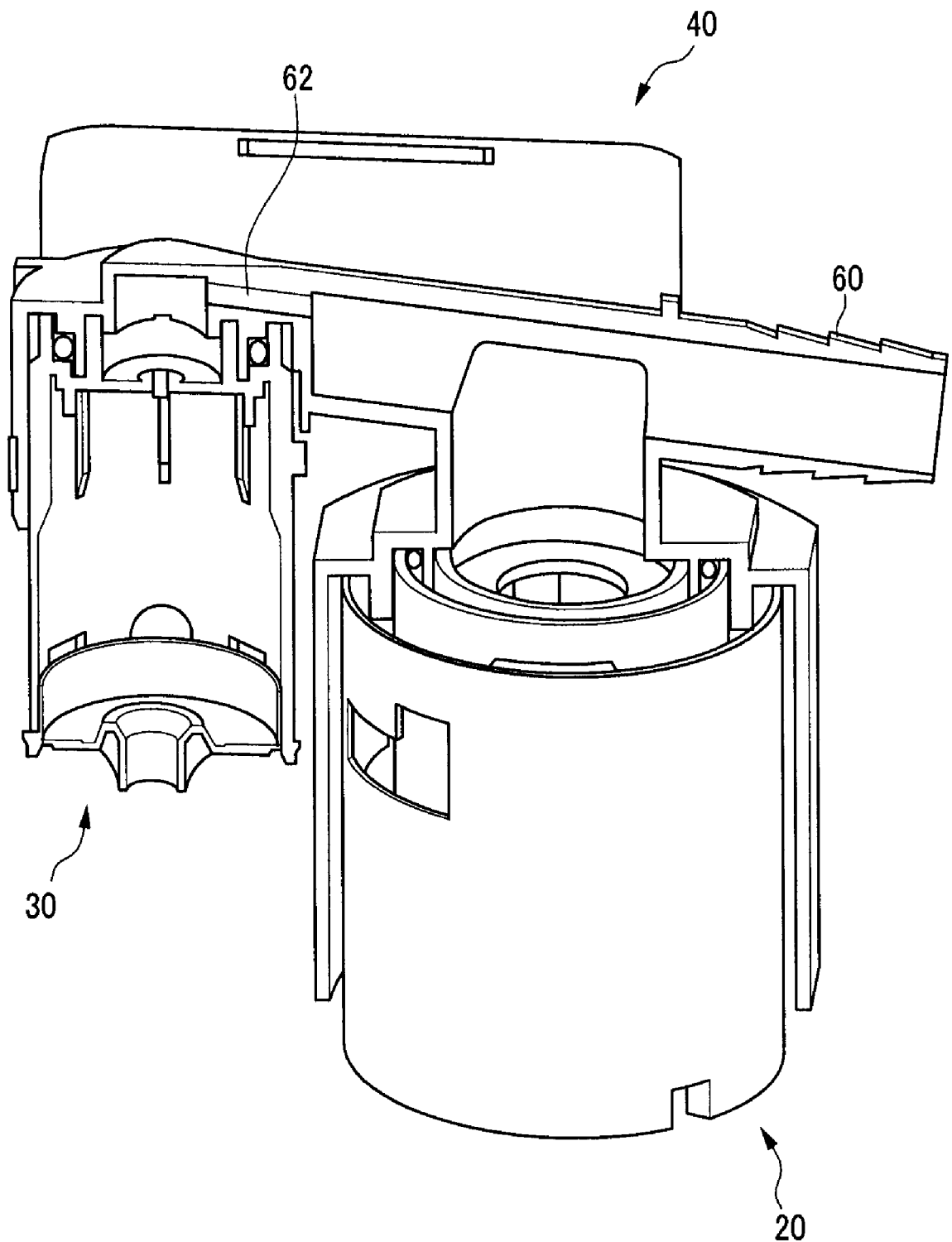
FIG. 4 is a cross-sectional view along a line IV-IV of the FIG. 3.

FIG. 4 is a cross-sectional view along a line IV-IV of the FIG. 3.

Referring to FIG. 1 to FIG. 4, a fuel supply system for a vehicle according to various embodiments of the present invention includes a fuel limit vent valve 20, a rollover valve 30 that is connected with the fuel limit vent valve 20, and a mounting plate 40 for mounting the fuel limit vent valve 20 and the rollover valve 30.

The fuel limit vent valve 20 collects evaporation gas in a fuel tank and supplies the evaporation gas to a canister, and the rollover valve 30 prevents fuel leakage when a vehicle overturns.

A protruding plate 42 is formed to the mounting plate 40.

Figure 5:
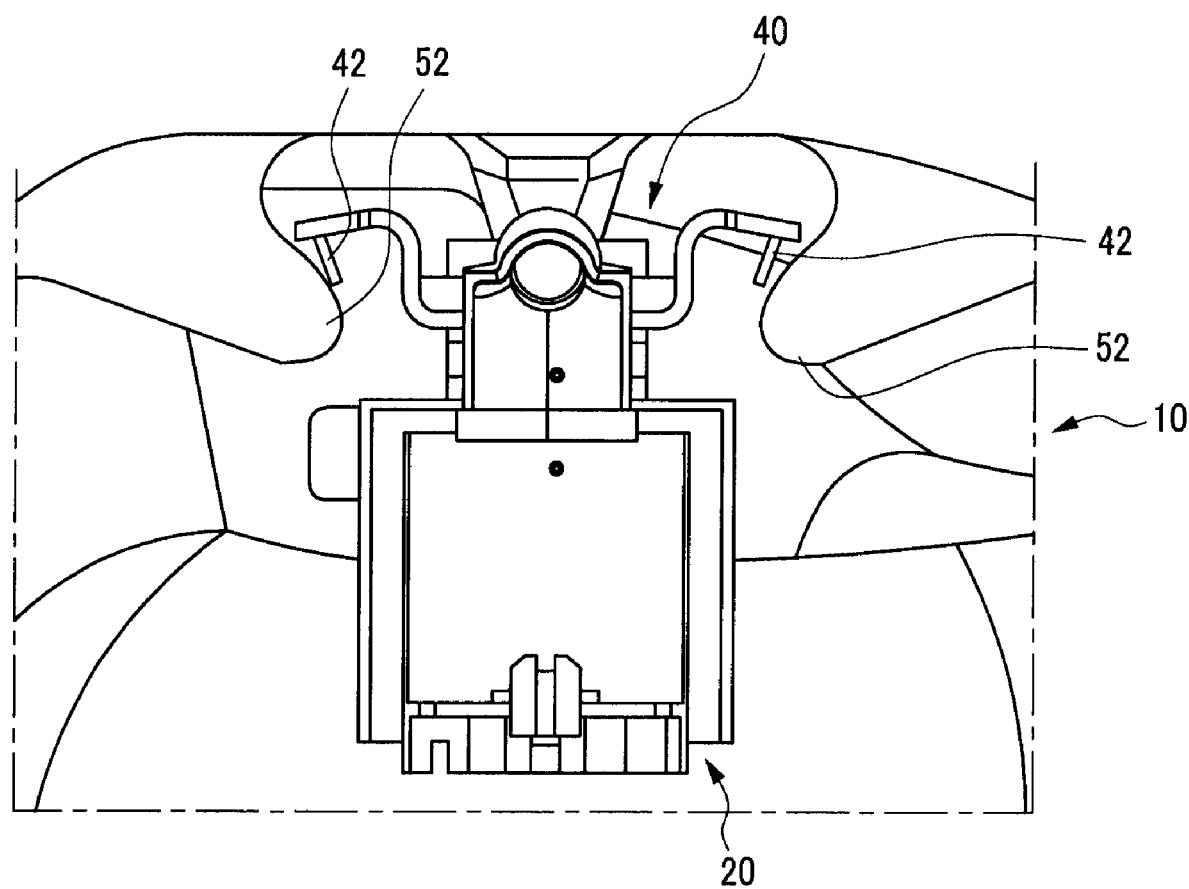
FIG. 5 is a drawing showing connection of a mounting plate and a side mounting portion of an exemplary fuel supply system according to the present invention.
Figure 6:
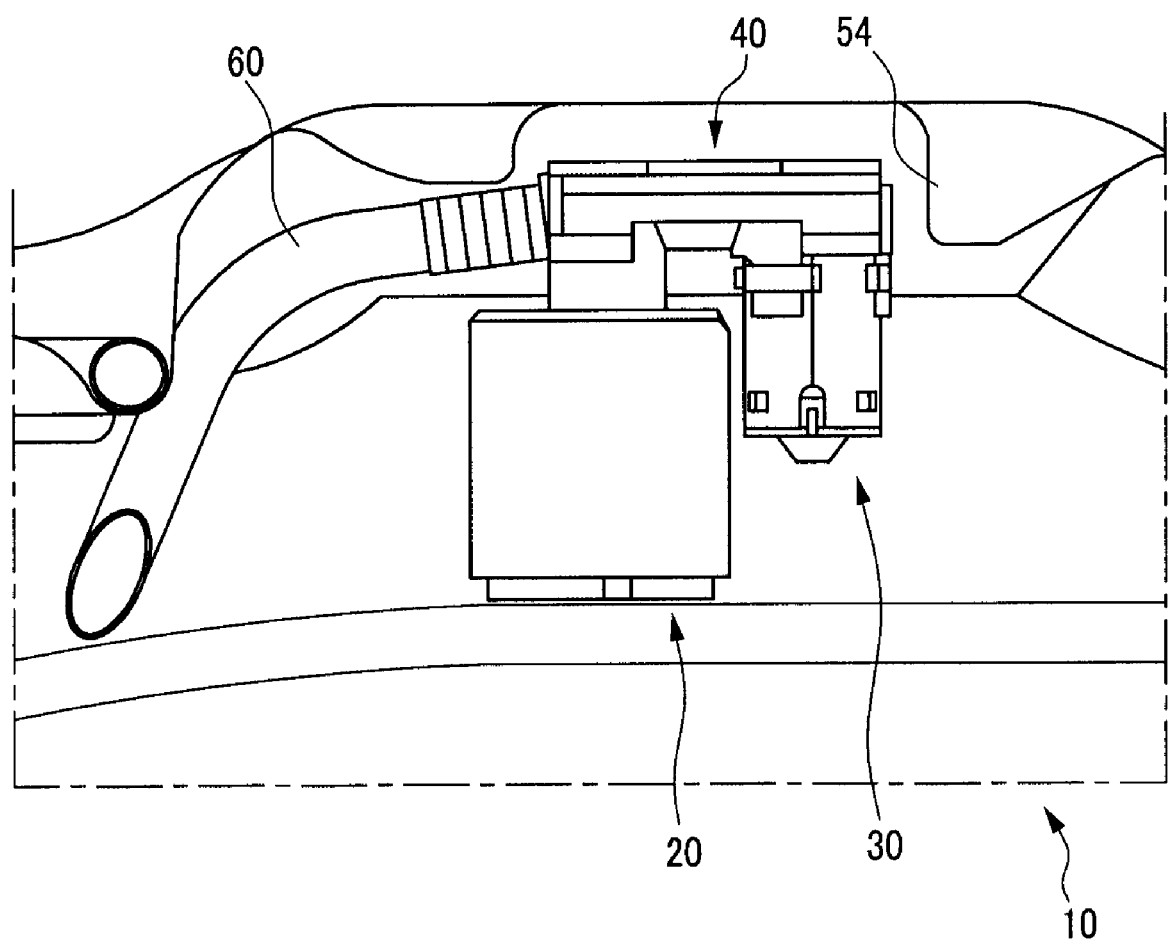
FIG. 6 is a drawing showing connection of a mounting plate and a rear mounting portion of an exemplary fuel supply system according to the present invention.

FIG. 5 is a drawing showing connection of a mounting plate and a side mounting portion of a fuel supply system according to various embodiments of the present invention, and FIG. 6 is a drawing showing connection of a mounting plate and a rear mounting portion of a fuel supply system according to various embodiments of the present invention.

Figure 7:
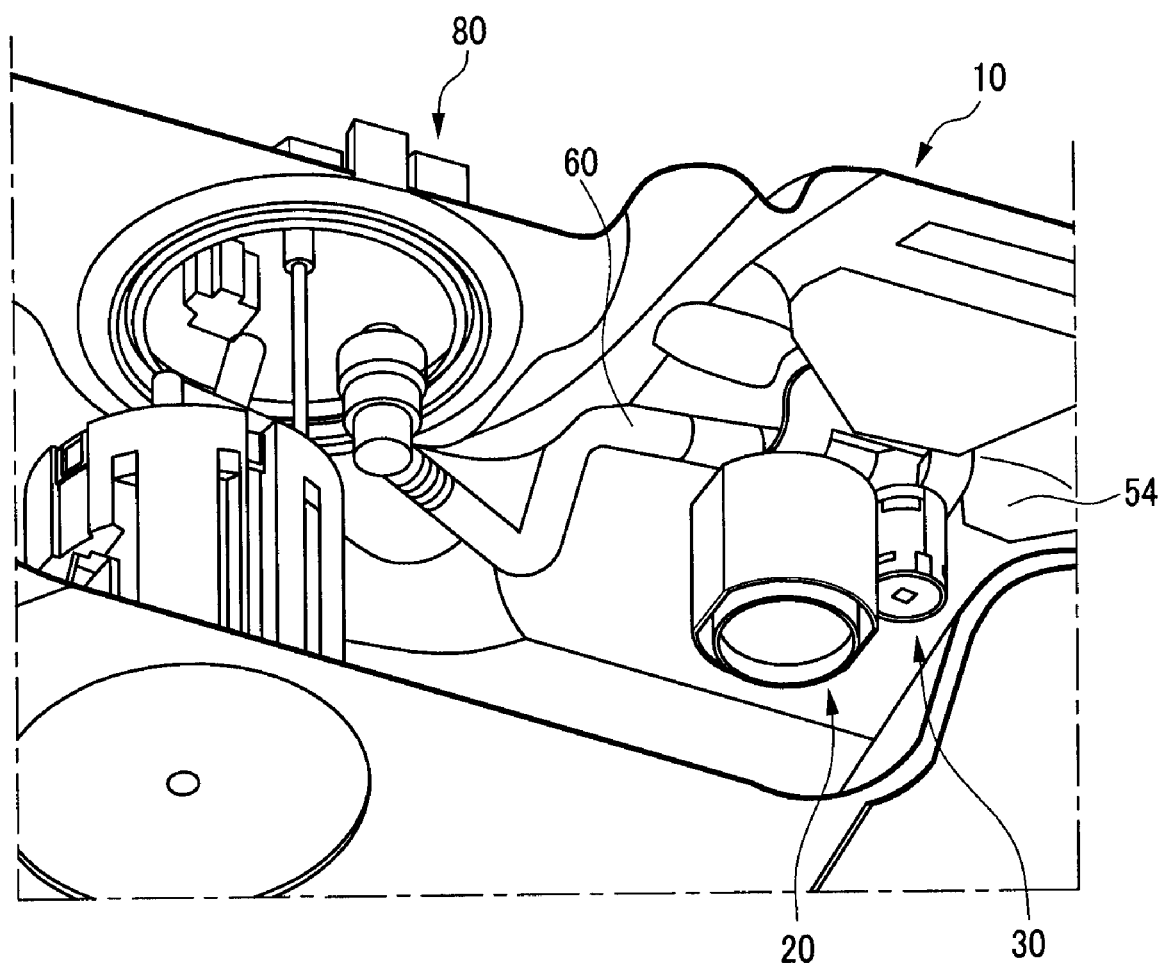
FIG. 7 is a partial cross-sectional view showing the inside of an exemplary fuel supply system according to the present invention.
Figure 8:
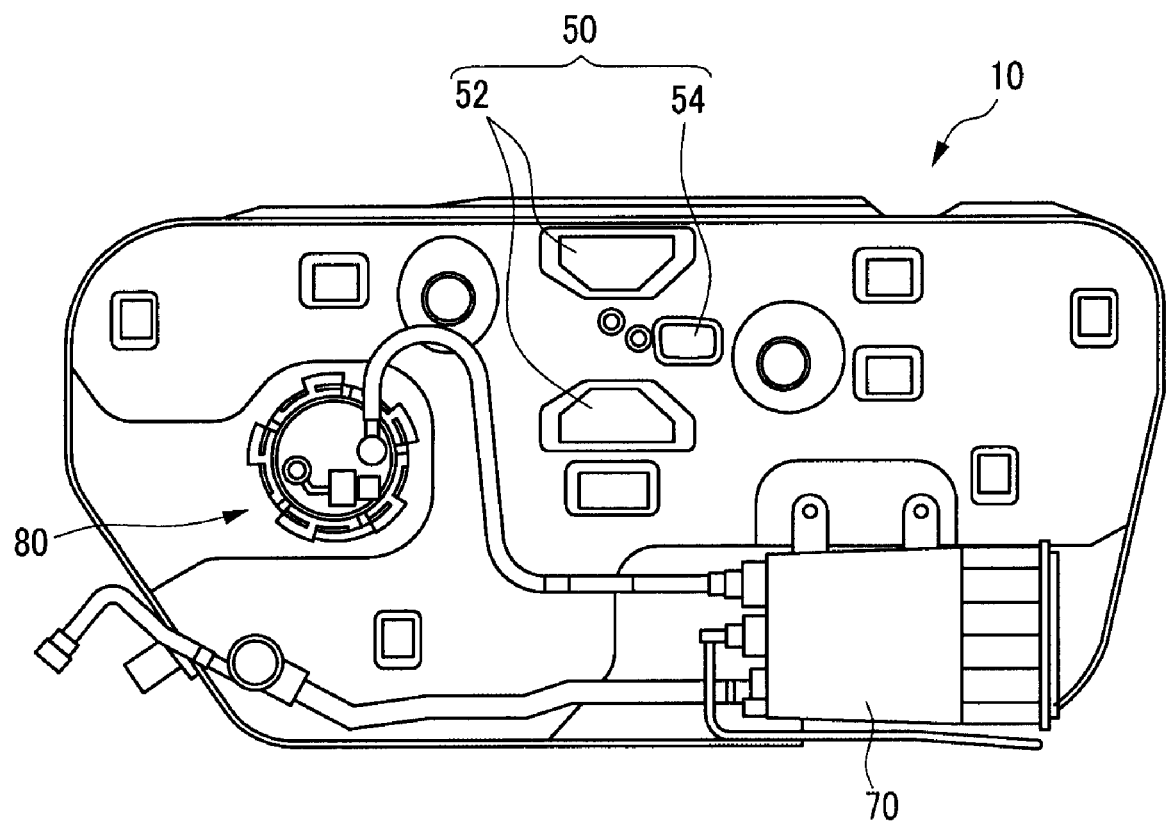
FIG. 8 is a drawing showing the outside of a fuel tank of an exemplary fuel supply system according to the present invention.

FIG. 7 is a partial cross-sectional view showing the inside of a fuel supply system according to various embodiments of the present invention, and FIG. 8 is a drawing showing the outside of a fuel tank of a fuel supply system according to various embodiments of the present invention.

Referring to FIG. 5 to FIG. 8, the fuel limit vent valve 20 and the rollover valve 30 are disposed within a fuel tank 10, and a mounting portion 50 is inwardly protruded within the fuel tank 10 for mounting the mounting plate 40.

The mounting portion 50 includes side mounting portions 52 that are symmetrically formed for the mounting plate 40 to be inserted therein, and a rear mounting portion 54 supporting the mounting plate 40.

As shown in FIG. 3 and FIG. 5, the protruding plate 42 is formed by bending an end portion of the mounting plate 40, and the side mounting portion 52 and the mounting plate 40 are connected by elastic force of the protruding plate 42.

As shown in FIG. 6, the rear mounting portion 54 supports the mounting plate 40, and prevents the mounting plate 40 from separating rightward and leftward of FIG. 6.

As described above, in the fuel supply system for a vehicle according to various embodiments of the present invention, a portion of the fuel tank is inwardly protruded and the fuel limit vent valve 20 and the rollover valve 30 are simultaneously configured therein.

The fuel tank 10 may be made of a plastic material.

Thus, production cost and weight of the fuel supply system can be reduced.

As shown in FIG. 4, the fuel limit vent valve 20 and the rollover valve 30 are connected by one evaporation gas exhaust passage 60, and a connecting passage 62 is formed between the fuel limit vent valve 20 and the rollover valve 30.

The evaporation gas exhaust passage 60, as shown in FIG. 8, is connected with a canister 70 that is disposed outside the fuel tank 10 via a fuel pump module 80.

Thus, the valves disposed inside the fuel supply system according to various embodiments of the present invention can be simply configured and have an evaporation gas exhaust passage in common so that the number of elements can be reduced.

In this construction, while the vehicle rolls over, the weight of fuel in the fuel tank 10 brings a negative pressure in the fuel tank 10 so that the fuel in the evaporation gas exhaust passage 60 may be sucked into the connection passage 62 to prevent the fuel from leaking to the outside. However, to increase a siphon effect in the connection passage 62, the diameter of the connection passage 62 is configured to be sufficiently smaller than the diameter of the evaporation gas exhaust passage 60. In other embodiments of the present invention, the longitudinal axis of the evaporation gas exhaust passage 60 may be disposed lower than a longitudinal axis of the connection passage 62 so that any bubbles that blocks the connection passage 62 while the vehicle rolls over may be removed to increase a siphon effect.

For convenience in explanation and accurate definition in the appended claims, the terms "front", "rear", "inside" and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel supply system for a vehicle, comprising:
   a fuel tank including a mounting portion protruding downwards from an upper inner surface of the fuel tank;
   a fuel limit vent valve and a rollover valve that is connected with the fuel limit vent valve within the fuel tank; and
   a mounting plate connecting the fuel limit vent valve and the rollover valve and configured to be mounted onto the mounting portion of the fuel tank.

2. The fuel supply system of claim 1, wherein the mounting portion is monolithically formed to the fuel tank.

3. The fuel supply system of claim 1, wherein the fuel tank is made of a plastic material.

4. The fuel supply system of claim 1, wherein the mounting portion comprises side mounting portions that are symmetrically formed with respect to a longitudinal axis of the fuel limit vent valve and the rollover valve to receive the mounting plate therein.

5. The fuel supply system of claim 4, wherein at least a protruding plate is formed to the mounting plate and is mounted onto the side mounting portions.

6. The fuel supply system of claim 5, wherein the protruding plate is formed by cutting off and bending an end portion of the mounting plate downwards.

7. The fuel supply system of claim 4, wherein distance between lower sides of the side mounting portions is shorter than distance between upper sides of the side mounting portions.

8. The fuel supply system of claim 7, wherein a protruding plate is formed to the mounting plate and is mounted onto the lower sides of the side mounting portions.

9. The fuel supply system of claim 1, wherein the mounting portion comprises a rear mounting portion configured to support the mounting plate in a rear position of the mounting plate.

10. The fuel supply system of claim 1, wherein an evaporation gas exhaust passage is formed to the mounting plate to fluid-communicate the outside with the fuel limit vent valve and a connection passage is formed to the mounting plate to fluid-communicate the fuel limit vent valve with the evaporation gas exhaust passage.

11. The fuel supply system of claim 10, wherein the evaporation gas exhaust passage is connected with a canister that is disposed outside the fuel tank.

12. The fuel supply system of claim 10, wherein the diameter of the connection passage is smaller than the diameter of the evaporation gas exhaust passage.

13. The fuel supply system of claim 10, wherein a longitudinal axis of the evaporation gas exhaust passage is disposed lower than a longitudinal axis of the connection passage.

14. The fuel supply system of claim 10, wherein the evaporation gas exhaust passage is coupled to an upper portion of the fuel limit vent valve and the connection passage is coupled to an upper portion of the rollover valve.

15. A passenger vehicle comprising the fuel supply system of claim 1.

* * * * *